March 27, 1962   H. HÖSLI   3,026,774
FIRING DEVICES FOR ROCKETS CARRIED IN CLUSTERS
BY A LAUNCHING MACHINE, AND IN
PARTICULAR AN AIRCRAFT
Filed Feb. 16, 1959   3 Sheets-Sheet 1

INVENTOR
HANSJAKOB HÖSLI,
BY
Larson and Taylor
ATTORNEYS

March 27, 1962 H. HÖSLI 3,026,774
FIRING DEVICES FOR ROCKETS CARRIED IN CLUSTERS
BY A LAUNCHING MACHINE, AND IN
PARTICULAR AN AIRCRAFT
Filed Feb. 16, 1959 3 Sheets-Sheet 2
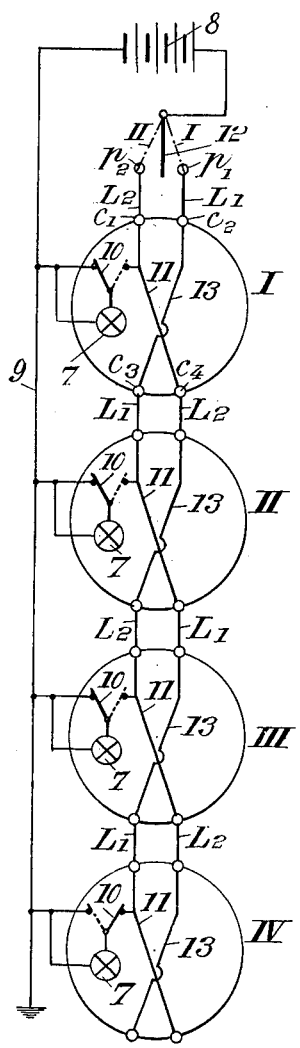
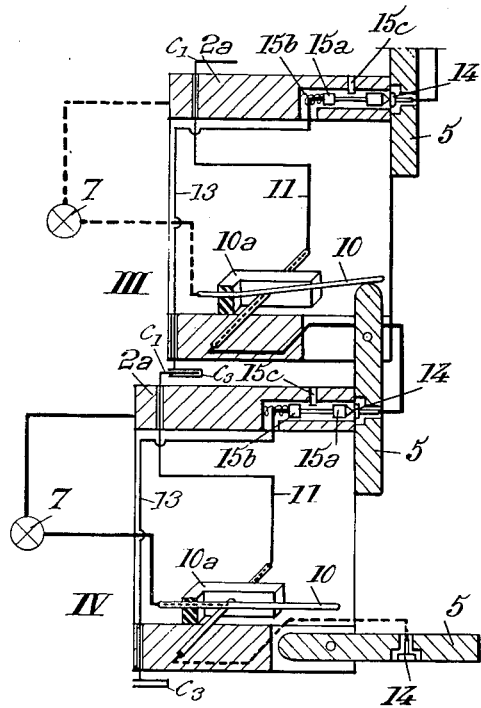
INVENTOR
HANS JAKOB HÖSLI
BY Larson and Taylor
ATTORNEYS March 27, 1962 H. HÖSLI 3,026,774
FIRING DEVICES FOR ROCKETS CARRIED IN CLUSTERS
BY A LAUNCHING MACHINE, AND IN
PARTICULAR AN AIRCRAFT
Filed Feb. 16, 1959 3 Sheets-Sheet 3

INVENTOR
HANSJAKOB HÖSLI,
BY
Larson and Taylor
ATTORNEYS

United States Patent Office 3,026,774
Patented Mar. 27, 1962

3,026,774
FIRING DEVICES FOR ROCKETS CARRIED IN CLUSTERS BY A LAUNCHING MACHINE, AND IN PARTICULAR AN AIRCRAFT
Hansjakob Hösli, Geneva, Switzerland, assignor to Brevets Aero-Mecaniques S.A., Geneva, Switzerland, a confederation of Switzerland
Filed Feb. 16, 1959, Ser. No. 793,487
Claims priority, application Luxembourg Feb. 20, 1958
3 Claims. (Cl. 89—1.7)

The present invention relates to rockets carried in clusters by a launching machine and in particular an aircraft. A cluster of rockets, in the meaning given to this term in the present description, is constituted by two or more rockets each of which is supported by another rocket or, in the case of the first rocket of the cluster, by an element of said launching machine (which will be hereinafter called "support") and is supporting another rocket, these rockets being intended to be fired successively, the last rocket of the cluster being the first to be fired.

The object of the invention is to provide an improved firing system for such a cluster of rockets. The rockets which form the cluster to be fired include each a movable member which passes from an inactive to an active position when the rocket to which it belongs becomes the last one of the cluster, due to the firing of all the rockets located after it, and every rocket is provided with a rocket igniting device, identical for all of them, and which includes a single excitation conductor extending through the rocket, a primer having one of its terminals permanently connected with one terminal of a source of current carried by the support, said source terminal being the same for all the primers, and means operative by said movable member of the rocket for placing the other terminal of said primer at a potential practically the same as the first terminal thereof when said member is in inactive position and for connecting said other primer terminal with said excitation conductor when said member comes into active position.

Now, according to the present invention, every rocket further comprises at least one transit conductor (and generally $n-1$ transit conductors, $n$ being an integer at least equal to 2) extending throughout it, the rockets being provided with cooperating contact means such that, when they are assembled in a cluster, the input and output ends of the excitation conductor of every rocket after the first one are connected, respectively, with transit conductors belonging to the preceding rocket and to the next rocket of the cluster, any of the input ends of the conductors of the first rocket of the cluster being adapted to be connected with the other terminal of said source of current by switch means such that, when the rockets are assembled in a cluster, at least two (and generally $n$) independent firing circuits may be successively connected with said source by operation of said switch means, the number of transit conductors inserted in series between two successive excitation conductors in each of said circuits being $n-1$, whereby, since only the last rocket of the cluster has its movable member in active position, the rockets of the cluster can be fired successively at time intervals determined by the shifting of said switch means from one independent circuit to the next one, recurrently.

Preferred embodiments of the present invention will be hereinafter described with reference to the accompanying drawings, given merely by way of example and in which:

FIG. 3 shows the electric layout of an embodiment of the firing system according to the invention for four rockets belonging to the same cluster.

FIG. 4 is an axial sectional view of the rear portions of two rockets one of which supports the other, this view showing in a more detailed fashion the ignition devices of the rockets in a firing system as diagrammatically illustrated by FIG. 3.

The rockets to be used according to the present invention may be of any suitable type and, in particular, as illustrated, they include a body 2 provided at the rear with a nozzle 2a through which escapes the jet of combustion gases supplied by the propelling charge of the rocket.

Figure 1:
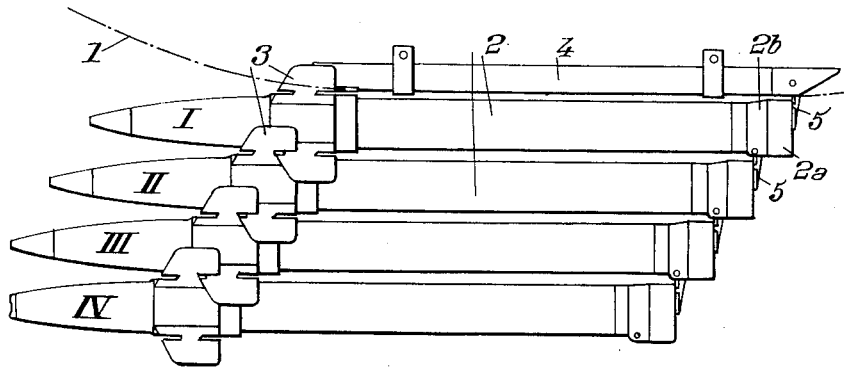
FIG. 1 is a diagrammatic elevational view showing a cluster of rockets mounted under the wing of an aircraft and to be fired by means of the system according to the present invention.

A cluster of such rockets is shown on FIG. 1 mounted under the wing 1 of an aircraft.

The devices for assembling each rocket with those located above and below it may be, as known, divided into a front portion and a rear portion, the front portion being advantageously constituted, for every rocket, by a sliding tail unit 3 which is temporarily mounted, before launching, in a forward position and acts as a guide for the rocket body during the beginning of launching, said sliding tail unit being carried along by the rear portion of the rocket, including a frusto-conical portion 2b, when it comes to engage said tail unit so that it then occupies the position which it is to have on the rocket body and where it remains during the flight of the rocket.

Said tail units 3 are each supported by the tail unit of the rocket located above it, or, for the top rocket I, by a support 4 fixed under the wing of the aircraft.

Each rocket II, and also support 4, includes a retractable plate 5 dimensioned and positioned in such manner that the plate of a rocket such as III extends sufficiently into the propelling jet of the next rocket IV located thereunder and supposed to be ignited, the plate 5 carried by support 4 extending into the propelling jet of the upper rocket I of the cluster when said upper rocket I is ignited in its turn.

Figure 2:
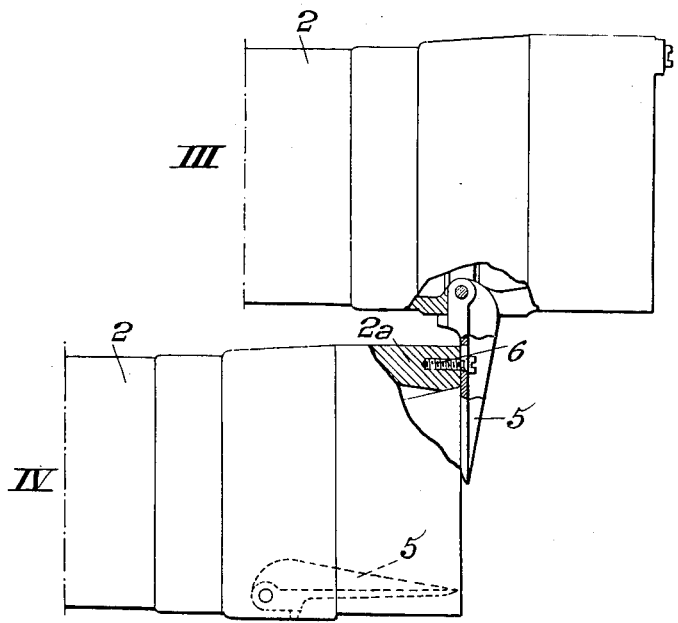
FIG. 2 shows, on an enlarged scale, in a more detailed fashion with parts in section, the rear portions of two rockets disposed one above the other.

As shown by FIG. 2, every plate 5 of a rocket, such as III, is connected to the nozzle 2a of the rocket located thereunder (in this case, rocket IV) through axial holding means, such as a screw 6. These screws are calculated so that when the last rocket of the cluster (rocket IV) is fired, the screw 6 mounted in the rear edge thereof breaks the combined effects of the thrust $p$ exerted on the corresponding plate 5 by the combustion gases from rocket IV and of the propelling thrust P acting upon said rocket IV in the forward direction. On the contrary, since the plates 5 of the other rockets (I, II and III) (and also the plate 5 of support 4) are not subjected to the action of a jet of combustion gases, the efforts on the screws 6 securing said rockets I, II and III are smaller and these screws have been calculated to withstand these efforts without breaking.

With such an arrangement, the firing rocket IV will cause the screw 6 which holds said rocket to be broken, thus releasing said rocket IV, the screws 6 of the other rockets being not broken by this ignition of rocket IV.

Thus, when a cluster of rockets as illustrated by FIG. 1 is ignited, the first rocket to be fired is rocket IV, then after this rocket has been launched, rocket III, rocket II and finally rocket I directly carried by support 4.

A first embodiment of the system according to the present invention for firing the rockets of a cluster as shown by FIG. 1 is illustrated by FIG. 3, where the rockets IV, III, II, I are represented by four circumferences, respectively.

Every rocket includes a primer 7 which promotes ignition of the propelling charge of said rocket, said primer being capable of being operated under the effect of an electric current flowing therethrough and supplied from an electrical source 8 located on the launching aircraft. On FIG. 3, the metallic structure of the cluster of rockets is conventionally represented by conductor 9, connected with the left-hand terminal of source 8. All the primers 7 have each one of their respective terminals connected with conductor 9.

This ignition device of every rocket (which ignition device is identical for all the rockets) includes among other elements a contacting arm 10 constantly connected to the other terminal of the primer 7 of this device. This arm 10 is actuated by a movable member belonging to the rocket and the position of which is changed when said rocket becomes the last one of the cluster.

In the embodiment illustrated by the drawings, this movable member is the plate 5 above described, the action of which will be more explicitly referred to hereinafter.

When a given rocket becomes the last one of the cluster, its contacting arm 10 is caused to pass from the position shown for rockets I, II and III (where the second mentioned terminal of primer 7 is at a potential substantially equal to that of conductor 9) to a position where it is electrically connected with an excitation conductor 11 (as shown for rocket IV on FIG. 3). Every excitation conductor 11 extends through the corresponding rocket from a contact $c_1$ to a contact $c_4$.

The ignition device of every rocket further comprises an insulated conductor 13 hereinafter called "transit" conductor and which extends from a contact $c_2$ to a contact $c_1$. When the rockets of the cluster are assembled together as shown for instance for rockets I, II, III and IV on FIG. 3, the output contact of the excitation conductor of one rocket is connected with the input contact of the transit conductor of the next rocket and the output contact of the transit conductor of one rocket is connected with the input contact of the excitation conductor of the next rocket. However, there is an exception for the last rocket IV, the two output contacts of the conductors of which are no longer connected with anything since no rocket is suspended to rocket IV. On the other hand, the input ends ($c_1$ and $c_2$) of the two conductors 11 and 13 of the first rocket I are connected to terminals $p_2$ and $p_1$ respectively.

In this way, two independent circuits $L_1$ and $L_2$ are formed in the cluster of rockets. Circuit $L_1$ starts from terminal $p_1$ and comprises the transit conductor 13 of rocket I, the excitation conductor 11 of rocket II, the transit conductor 13 of rocket III and the excitation conductor 11 of rocket IV. The other independent circuit $L_2$ starts from terminal $p_2$ and comprises the excitation conductor 11 of the first rocket I, the transit conductor 13 of rocket II, the excitation conductor 11 of rocket III and the transit conductor 13 of rocket IV.

A switch 12 having a rotating arm connected constantly to the right hand terminal of current source 8 can occupy either of two positions 1 and 2. In the first of these positions, it connects circuit $L_1$ with said terminal of source 8 and in the second position, switch 12 connects circuits $L_2$ with the same terminal. Supposing that switch 12 is in position II, since the contacting arm 10 of the ignition devices of rockets I, II and III are in the position which short-circuits the corresponding primers 7, the second independent circuit, to wit $L_2$ is ineffective because it has no connection with return contact 9 leading to the left hand terminal of source 8.

On the contrary, when switch 12 is in position I, current can flow through circuit $L_1$ and pass through the contacting arm 10 of the last rocket IV, and through the primer 7 of this rocket to return conductor 9. This operates primer 7 and the propelling charge of said rocket is ignited, thus causing said rocket to be launched. After the launching of rocket IV, rocket III becomes the last rocket. Under the action of the propelling gases of rocket IV when it has been launched, the screw 6 carried by the rear edge of said rocket has been broken and the plate 5 pivotally mounted on rocket III has been pushed by the propelling gases of rocket IV from the vertical position shown by FIG. 2 into a horizontal position similar to that shown in dotted lines for the plate 5 of rocket IV.

Plate 5 when passing from the vertical (inactive) position to the horizontal (active) position causes the contacting arm 10 of rocket III to shift from the position shown in solid lines on FIG. 3 to the position shown in dotted lines. Thus, the excitation conductor of rocket III and therefore circuit $L_2$ have been connected by the contacting arm 10 of rocket III with return conductor 9. However, since switch 12 is now in position I, the circuit is open between $p_2$ and source 8 and the ignition device of rocket III is not operated. It is only when switch 12 is shifted from position I to position II that said rocket III is launched. Thus the successive firing of the rockets of the cluster is controlled by the alternate shifting of switch 12 from one position to the other.

Switch 12 may be operated manually. However, it seems preferable to have it driven by a suitable mechanism (not shown) which causes said switch 12 to pass alternately from one of its position to the other at given time intervals. These time intervals may be very short, for instance one tenth of a second, because the plate 5 of the rocket preceding that which is launched passes nearly instantaneously from inactive to active position.

FIG. 4 shows in a more detailed fashion the construction of the igniting devices of the rockets.

As shown by this figure, contacts $c_1$ and $c_3$ are constituted respectively by a pin and a socket in which said pin is slidably engaged when the rockets are assembled together to form the cluster of rockets. Contact $c_4$ is a part 14 carried by plate 5 and contact $c_2$ is constituted by the end of a sliding member 15a, 15b movable in the rocket and pushed by a spring toward part 14. When rockets III and IV are assembled together as shown by FIG. 4, conductors 11 and 13 constitute portions of the circuits $L_1$ and $L_2$ shown by FIG. 3. The contacting arm 10 is a resilient rod mounted on a support 10a of an insulating material, the left hand end of said arm 10 being connected with on terminal of primer 7 whereas the other end of said arm 10 is engaged by plate 5 when said plate occupies its inactive position, thus preventing said arm 10 from contacting the portion of conductor 11 above which it passes. This is the position occupied by the arm 10 of rocket III in FIG. 4. On the contrary, when the plate 5 of the rocket has been brought into horizontal (active) position, it ceases to engage the end of contacting arm 10 which resumes its normal position in which it contacts conductor 11.

It should be pointed out that the simplest construction of the firing system according to my invention is that illustrated by FIGS. 3 and 4, where there are only two independent circuits $L_1$ and $L_2$.

Sliding contact member 15a—15b has its part 15b mounted to be in contact with an abutment 15c of a conductive material carried by the metallic body of every rocket when spring 15b is not compressed.

Thus, when a rocket is not inserted in a cluster (and consequently its plate 5 is in active or horizontal position, thus allowing contacting arm 10 to contact conductor 11) conductor 11 is connected at 15c with the metallic body of the rocket. Thus, in this case both terminals of primer 7 are connected with said metallic mass.

Figure 5:
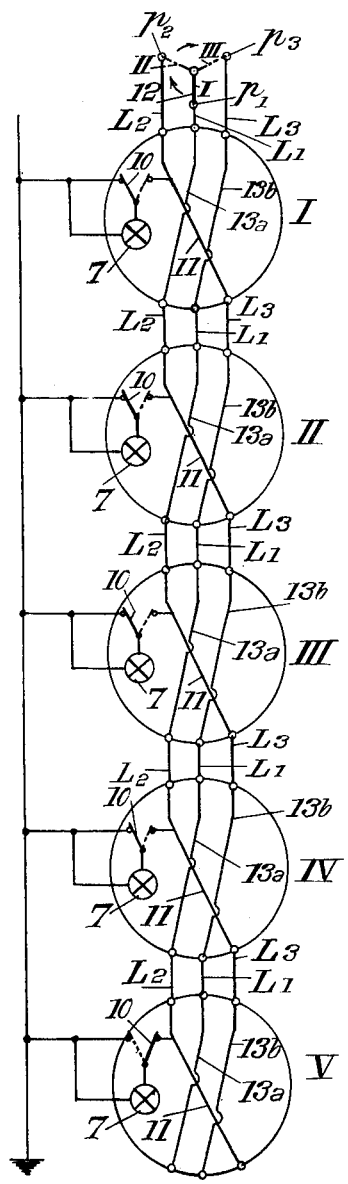
FIG. 5 shows a modification of the system of FIG. 3, applied to a cluster of five rockets.

The system might include more than two successive circuits. In particular, FIG. 5 shows an example where there are three independent circuits $L_1$, $L_2$ and $L_3$, each of these circuits, for instance $L_2$, includes the excitation conductor 11 or rocket I, one of the two transit conductors 13b of rocket II, one of the two transit conductors 13a of rocket III, the excitation conductor 11 of rocket IV, and one of the transit conductor 13b of rocket V. In this case, the switch means 12 connected with the current source must cooperate with the three circuits $L_1$, $L_2$ and $L_3$, that is to say the arm of said switch means must be capable of having three positions I, II and III where it cooperates with contacts $p_1$, $p_2$ and $p_3$.

In a general manner, while I have, in the above description, disclosed what I deem to be practical and efficient embodiment of my invention, it should be well understood that I do not wish to be limited thereto as there might be changes made in the arrangement, disposition and form of the parts without departing from the principle of the present invention as comprehended within the scope of the accompanying claims.

What I claim is:

1. For use in connection with the combination of a launching support, at least two rockets, a supporting one and a supported one, holding means carried by said support for detachably suspending said supporting rocket to said support, holding means carried by said supporting rocket for detachably suspending said supported rocket to said supporting rocket, holding means carried by said supported rocket and capable of detachably suspending still another rocket to said supported rocket, and a member movably carried by each of said two first mentioned rockets, each of said members being arranged to occupy either an inactive position when a rocket is actually suspended to the rocket to which said member belongs or an active position when no rocket is suspended to said rocket, a firing system for said rockets which comprises in combination a source of electric current carried by said support, electrical conductor means connected with one terminal of said source, an electric igniting device carried by each of said two first mentioned rockets, said igniting devce including a primer operable by electric current caused to flow therethrough, one terminal of said primer being connected with said electrical conductor means, at least two conductors extending through each of said two first mentioned rockets, one of said two conductors being a transit conductor wholly insulated from one end to the other, the other of said two conductors being a primer excitation conductor insulated in said rocket, and contacting means operatively connected with said member of said rocket for placing the other terminal of said primer in electric connection with said primer excitation conductor when said member is in active position and for holdng said last mentioned primer terminal out of connection with said primer excitation conductor when said member is in inactive position, cooperating contact means carried by each of said two first mentioned rockets for connecting, when said supported rocket is suspended to said supporting rocket, one end of the transit conductor of said supported rocket with one end of the primer excitation conductor of said supporting rocket and one end of the primer excitation conductor of said supported rocket with one end of the transit conductor of said supporting rocket, and switch means for connecting the other terminal of said source either with the other end of said transit conductor of said supporting rocket or with the other end of said primer excitation conductor of said supporting rocket.

2. A firing system according to claim 1 in which said movable member of each rocket is a plate pivoted to the rear portion of said rocket and located so as to project, in inactive position, into the space immediately behind the rear nozzle of the next rocket.

3. A firing system according to claim 2 in which said contacting means include a resilient arm deformed by said plate.

References Cited in the file of this patent

UNITED STATES PATENTS

| | | |
|---|---|---|
| 2,761,385 | Schlumberger | Sept. 4, 1956 |
| 2,792,756 | Schneiter | May 21, 1957 |
| 2,824,496 | Kuller et al. | Feb. 25, 1958 |